US005613825A

United States Patent [19]

Dorn

[11] Patent Number: 5,613,825

[45] Date of Patent: Mar. 25, 1997

[54] WHEELCHAIR LIFT APPARATUS

[75] Inventor: Russell J. Dorn, Aurora, Colo.

[73] Assignee: Stewart & Stevenson Power, Inc., Commerce City, Colo.

[21] Appl. No.: 335,501

[22] Filed: Nov. 7, 1994

[51] Int. Cl.$^{6}$ ..................... B60P 1/44

[52] U.S. Cl. ..................... 414/543; 414/541; 414/544; 414/921; 414/633; 187/225; 254/2 R; 105/443

[58] Field of Search ..................... 414/539, 540, 414/541, 542, 543, 544, 545, 668, 662, 663, 665, 666, 921, 667, 669, 670, 671, 672, 637, 630, 631, 632, 633; 187/222, 229, 225; 254/2 R, 2 C; 105/443, 447, 444, 445

[56] References Cited

U.S. PATENT DOCUMENTS

| | | | |
|---|---|---|---|
| 2,899,088 | 8/1959 | Corbin | 414/541 |
| 3,182,826 | 5/1965 | Mutto | 414/541 |
| 3,445,019 | 5/1969 | Steinert | 414/633 |
| 3,847,292 | 11/1974 | Williams et al. . | |
| 4,140,230 | 2/1979 | Pearson . | |
| 4,281,744 | 8/1981 | Koerber . | |
| 4,299,528 | 11/1981 | Kazeil et al. | 414/546 |
| 4,479,753 | 10/1984 | Thorley | 414/541 |
| 4,483,653 | 11/1984 | Waite | 414/921 X |
| 4,493,603 | 1/1985 | Williams et al. | 414/541 |
| 4,534,450 | 8/1985 | Savaria . | |
| 4,690,609 | 9/1987 | Brown | 414/544 X |
| 5,026,244 | 6/1991 | Dorn | 414/540 |
| 5,149,246 | 9/1992 | Dorn | 414/541 |
| 5,180,275 | 1/1993 | Czech et al. | 414/541 |
| 5,308,214 | 5/1994 | Crain et al. | 414/541 |

FOREIGN PATENT DOCUMENTS

| | | | |
|---|---|---|---|
| 1456921 | 10/1969 | Germany | 414/633 |
| 2928607 | 2/1981 | Germany | 414/541 |
| 1486379 | 6/1989 | U.S.S.R. | 414/543 |
| 1407286 | 9/1975 | United Kingdom | 414/633 |

*Primary Examiner*—Frank E. Werner
*Attorney, Agent, or Firm*—John E. Reilly

[57] ABSTRACT

A wheelchair lift mechanism adapted for use particularly in the accessway of a train car is disclosed which comprises a generally planar collapsible platform assembly for receiving a wheelchair and its occupant thereon; a lift mechanism for lifting and lowering the platform between first and second elevations; a vertical support column mounted inside the train car adjacent the accessway having a support portion rotatably mounted thereto; and an extensible lift mechanism support assembly attached between the support portion and the lift mechanism frame to move the lift mechanism and platform assembly horizontally between a retracted position and an extended position away from the vertical support column to provide lateral clearance for the platform assembly outside the vehicle in the deployed position. The extensible assembly comprises a pair of parallel fixed sleeve members and a pair of parallel slide members telescopically attached between the frame and the support portion. A hydraulic cylinder controllably extends and retracts the slide members within the sleeve members.

29 Claims, 2 Drawing Sheets

WHEELCHAIR LIFT APPARATUS

BACKGROUND AND FIELD OF INVENTION

This invention generally relates to a lift apparatus and more particularly to a novel and improved telescoping and collapsible wheelchair lift apparatus specifically adapted for use in vehicular applications, such as, railway cars.

This invention is in the field of wheelchair lifts for lifting and lowering wheelchairs between the floor level of a commercial vehicle and a street or platform level. Among the objectives in such designs is to provide an assembly that takes up minimum space in storage, does not impede normal ingress and egress to and from the vehicle through its accessway, and can be easily and rapidly moved from the stored position to a deployed operational position under the complete control of the operator.

Representative lift mechanisms are disclosed in U.S. Pat. Nos. 4,479,753, to G. R. Thorley, 4,534,450 to P. Savaria, 4,299,528 to J. E. Kazeil et al and 4,140,230 to M. R. Pearson and in my previous U.S. Pat. Nos. 5,026,244 and 5,149,246. The collapsible wheelchair lift apparatus disclosed in my previous patents is particularly designed for installation in the doorway of a motor vehicle such as a commercial bus or van. A vertical column fastened to the floor and ceiling of the vehicle in the doorway supports the wheelchair lift assembly for swiveling about the column from a storage position in the vehicle to an operational position outside the vehicle, through an arc of about 180°. Since the column is mounted directly in the doorway, the lift apparatus and the column takes up a portion of the width of the doorway which would otherwise be available for passenger access. Therefore there remains a need for a wheelchair lift apparatus which provides both for an unrestricted normal ingress and egress passageway and convenient deployment of a wheelchair lift apparatus through the accessway from a stored position to the operational position outside the vehicle.

For railway car installation, a wheelchair lift apparatus must provide access to the car for handicapped persons from the train station platform, typically at or near track level, to the floor level of the train car, which is typically three to five feet above the track level. Many train cars cannot accommodate a support column or post in the accessway due to the narrow width of the accessway. In addition, modern train cars often do not have a vertical side wall. It may also be difficult to provide a support column immediately adjacent the accessway due to the thickness of the side wall or other structural obstruction. Accordingly there is a need for a wheelchair lift apparatus which can be supported from a vertical support inside the vehicle and spaced to the side of the accessway so as not to impede normal access; and which is capable of being expanded or extended the additional distance necessary to clear the outside wall of the railway car as well as to be collapsible into a compact arrangement for storage within the vehicle, out of the accessway.

SUMMARY OF THE INVENTION

It is therefore an object of the present invention to provide a novel and improved wheelchair lift apparatus that can be telescopically extended and retracted into a compact storage location adjacent the accessway into the vehicle and deployed to an extended operational position external to the vehicle.

It is another object of the invention to provide an improved wheelchair lift apparatus that does not extend into the accessway in the stored position in the vehicle.

It is another object of the invention to provide an improved wheelchair lift apparatus that is mounted on a vertical columnar support inside the vehicle adjacent to and to one side of the accessway which provides the necessary lateral clearance for vertical movement in the deployed, operational position.

It is another object of the invention to provide an improved wheelchair lift apparatus that can be remotely operated between the storage and deployed positions.

It is a still further object of the invention to provide an improved economically compact wheelchair lift apparatus especially adapted for use in a railway car.

It is a still further object of the invention to provide an improved wheelchair lift apparatus mounted adjacent the passenger accessway of a railway car which takes up less storage space than a wheelchair lift apparatus mounted in the accessway.

It is a still further object of the invention to provide an improved wheelchair lift apparatus which is smoothly extensible in order to clear the side wall of a railway car without binding.

It is a still further object of the invention to provide an improved wheelchair lift apparatus having a rugged telescopic support which distributes the load of a wheelchair support platform assembly over a broad area.

The present invention basically involves the modification of a collapsible wheelchair lift apparatus such as is shown and described in my U.S. Pat. Nos. 5,026,244, and 5,149,246 for use in a vehicle such as a railway car requiring the accessway to remain clear when the lift apparatus is in a stored position and provide additional lateral clearance between the support post or other support structure to which the wheelchair lift assembly is ultimately secured and the outer surface of the vehicle body without enlarging the volume envelope of the stored apparatus in the vehicle.

The present invention generally comprises providing a remotely operable extensible support assembly between a vertical support column which is fastened to the inside of the body of the vehicle such as a train car and a collapsible wheelchair lift apparatus such as is shown and described in my U.S. Pat. Nos. 5,026,244, and 5,149,246. The apparatus as disclosed in these patents is illustrated and used throughout this specification as being merely representative of a conventional wheelchair lift apparatus which incorporates the invention.

More particularly, the improved wheelchair lift apparatus incorporating the extensible support assembly in accordance with the present invention comprises a collapsible, generally planar platform assembly for receiving a wheelchair and its occupant thereon; a vertical support member such as a column mounted inside the vehicle such as a railway car adjacent to and spaced from the accessway having a support portion rotatably mounted thereon; and a lift mechanism operably connected between the platform assembly and the support portion for lifting and lowering the platform between first and second elevations.

The extensible support assembly preferably hydraulically and telescopically moves the wheelchair lift mechanism horizontally, or laterally, between a retracted position within or to one side of the accessway and an extended position beyond or outside of the outer side wall of the vehicle. The extensible assembly when retracted enables compact storage and lateral clearance of the apparatus for rotational passage through the accessway. The support assembly is laterally extended when the apparatus has cleared the accessway to clear the outer side wall of the vehicle for deployment of the wheelchair lift platform assembly.

The extensible support assembly preferably comprises a pair of parallel sleeve members each having one end fixed to the wheelchair lift mechanism frame. A pair of parallel slide members each having one end fixed to the support portion of the vertical support member has their other ends telescopically received in the free ends of the fixed sleeve members. Drive means, preferably a hydraulic cylinder, is connected via linkage arms between the frame and the support portion for controllably extending and retracting the slide members within the sleeve members to move the frame between the retracted storage position and the extended operational position without binding.

The above and other objects of the present invention will become more readily appreciated and understood from a consideration of the following detailed description of preferred and modified forms of the present invention when taken together with the accompanying drawings in which:

DETAILED DESCRIPTION OF THE PREFERRED EMBODIMENT

Figure 2:
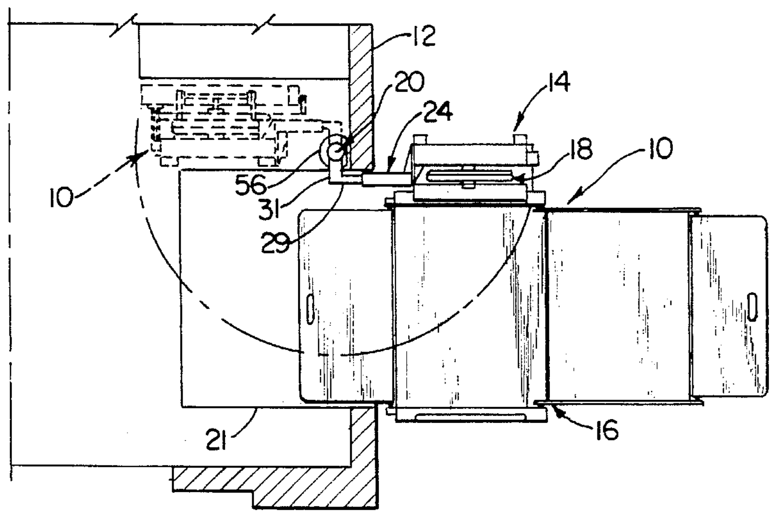
FIG. 2 is a plan view of the wheelchair lift apparatus shown in FIG. 1.
Figure 1:
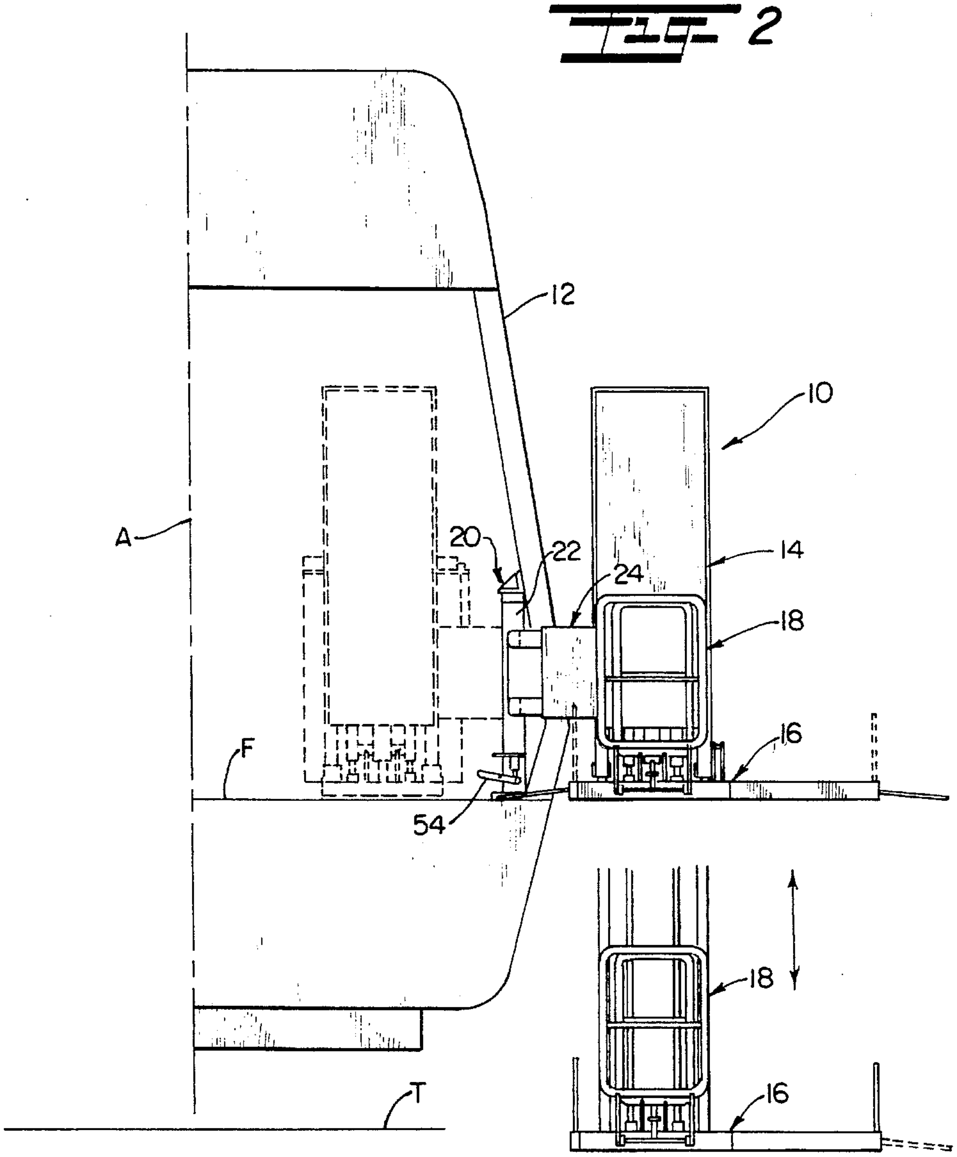
FIG. 1 is a partial elevational cross sectional view through the accessway of a passenger train car showing the wheelchair lift assembly in accordance with the present invention in a deployed position both at a level of a train station platform and at the train car floor elevation and showing the stored position in phantom.

Referring now to the drawings, an elevational view of the preferred form of wheelchair lift apparatus 10 is shown by way of illustrative example mounted in a railway car. The lift mechanism and platform assembly disclosed and shown in my previous U.S. Pat. Nos. 5,149,246 and 5,016,244 is shown in FIGS. 1 and 2 and is merely illustrative of the wheelchair lift mechanisms to which the present invention applies. FIG. 1 depicts only the right half of the railway car 12, as the cross section of the car is generally symmetrical about vertical axis A.

The wheelchair lift apparatus 10 broadly comprises a conventional wheelchair lift mechanism frame 14, a conventional wheelchair support platform assembly 16, and a conventional wheelchair lift mechanism 18 operably connected between the platform assembly 16 and the frame 14. The lift mechanism frame 14 basically includes a pair of spaced parallel vertical tubes and cross tubes in a rigid arrangement to support the lift mechanism 18 and platform assembly 16, the latter being hinged to the lower end of the frame for swinging movement between a horizontal position extending across the accessway, shown in full in FIG. 2, and a vertical collapsed position parallel to the lift mechanism 18, shown in dotted form in FIG. 2. The lift mechanism 18 is operable to lower the platform assembly 16 to the level "T" of the railway track and raise the platform assembly 16 to the railway car floor elevation "F".

The wheelchair lift apparatus 10 includes a conventional vertical column support member 20 fastened to the floor "F" and to the interior side wall of the railway car 12 at a location adjacent to and to one side of the accessway 21 into the railway car 12. The vertical support column 20 is a rotation column which includes a bearing supported, rotatable support tube portion 22 which is free to rotate through about 180° about the vertical axis of the vertical support column 20. The rotatable support tube portion 22 is preferably journaled to the vertical support column 20 at top and bottom to minimize the effort required to rotate the lift mechanism and platform assembly between the storage position as shown in phantom in FIGS. 1 and 2 and the deployed and operable position shown in full in these same Figures.

The preferred embodiment of apparatus 10 in accordance with the present invention and illustrated herein further includes a telescoping lift mechanism support assembly 24 connected between the lift mechanism frame 14 and the rotatable support tube portion 22 of the vertical support column 20. The platform assembly 16, the lift mechanism 18 and its frame 14, a wheelchair and its occupant constitutes a substantial load on the support assembly 24, and the support assembly 24 must be capable of suspending this load for rotation about the column 20 as well as being smoothly extensible and retractable without binding.

Figure 3:
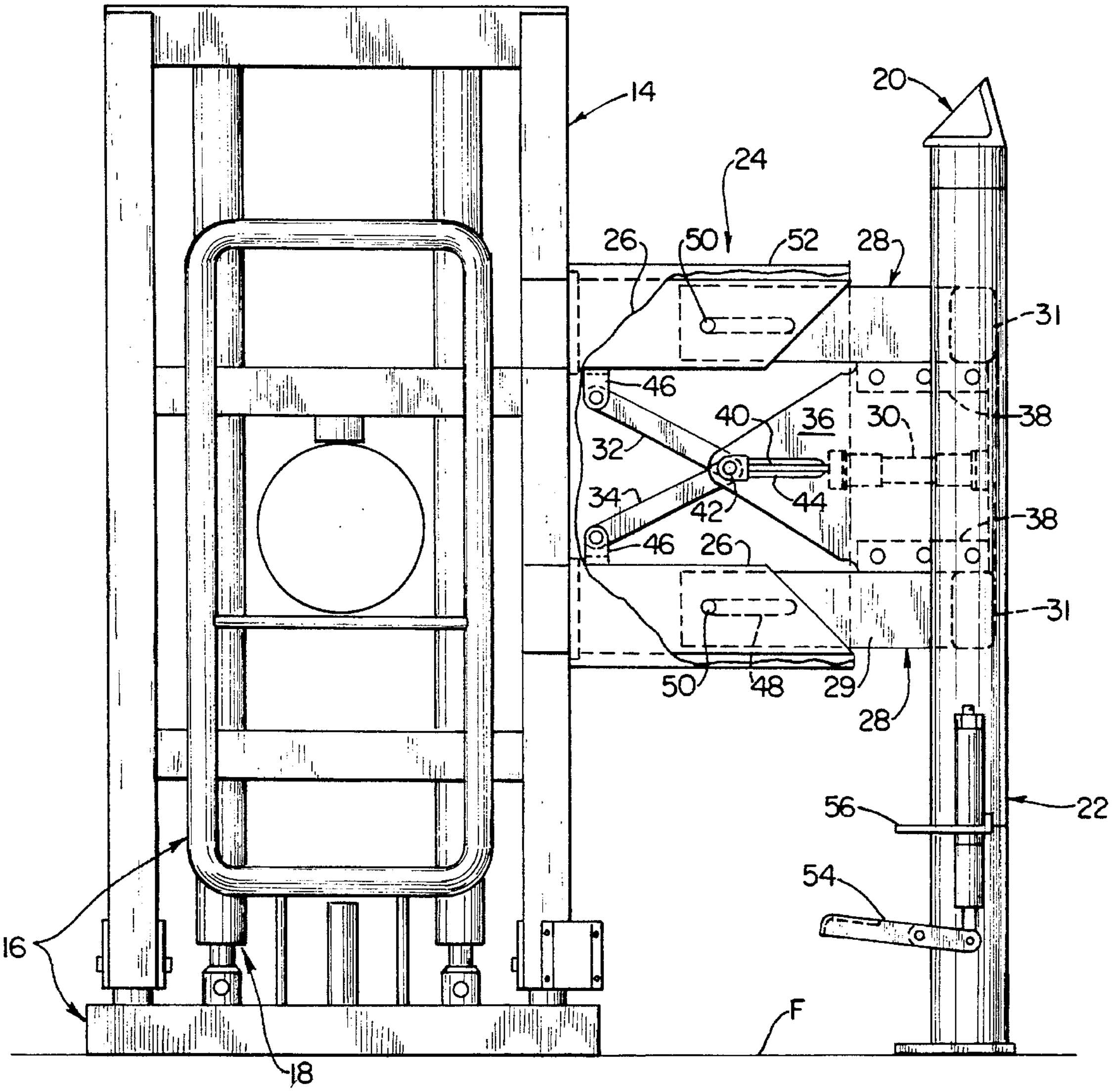
FIG. 3 is a front view of the wheelchair lift apparatus of the present invention shown in a partially stored position in the accessway of the train car with portions broken away, showing the extensible support assembly in the extended position.

Referring now to FIG. 3, the extensible support assembly 24 includes a pair of parallel, vertically spaced, fixed sleeve members 26 each having one end welded or otherwise fixed for horizontal extension from the lift mechanism frame 14. The fixed sleeve members 26 each has a generally rectangular tubular cross-sectional shape. A pair of upper and lower parallel L-shaped slide members 28 each has a longer leg portion 29 telescopically received in the other end of one of the fixed sleeve members 26 and a shorter leg portion 31 welded or otherwise fixed to the support portion 22 of the vertical support member 20. The slide members 28 in this embodiment have rectangular tubular cross-sections. The shorter leg portions 31 are integrally joined to the long leg portions 29 at an angle of about 90°. The shorter leg portions 31 of the L-shaped slide members 28 provides an offset of between about three to about six inches. This offset is provided so that the vertical support column 20 can be spaced laterally from the side of the accessway 21 and the apparatus 10 can be more efficiently stored substantially clear of the accessway 21 as is best shown in phantom in FIG. 2.

A hydraulic cylinder 30 is operably connected horizontally between the lift mechanism frame 14 and the rotatable support portion 22 via upper and lower converging linkage arms 32 and 34. The hydraulic cylinder 30 is preferably sandwiched between and bolted to a pair of pentagonal gusset plates 36. The gusset plates 36 each have a rectangular portion with opposing sides bolted to the spacer flanges 38 and a triangular portion having an apex oriented toward the lift mechanism frame 14. The spacer flanges 38 are in turn welded to the facing surfaces of the longer leg portions 29 of the slide members 28 adjacent the 90° angle bend between the longer and shorter legs.

One end of each of the converging linkage arms 32 and 34 is connected to the free end of the piston rod 40 extending out of the hydraulic cylinder 30. This connection is made by a cross pin 42 which rides in and is guided by an elongated closed slot 44 in each of the plates 36. Each slot 44 is parallel to each of long leg portions of the slides 28 and in line with the apex of the plate 36 so that extension and retraction of the piston rod 40 is constrained to move parallel to the slides 28 and the sleeves 26.

The other ends of the upper and lower linkage arms 32 and 34 are pivotally attached to the sleeve members 26 via hinges 46 adjacent the frame 14 so that extension and retraction of the piston rod 40 causes the sleeves 26 to telescopically slide in parallel on the longer legs 29 of the slide members 28. Each of the sleeves 26 has a plastic strip bearing between upper and lower mating surfaces of the telescoping members to facilitate smooth telescopic movement between the slide members 28 and sleeve members 26.

Each plastic strip bearing may be made of Teflon or other material having a low coefficient of friction under compressive load. The assembly 24 is massively designed with sleeve 26 and slides 28 of box tubular construction to carry a substantial load during extension and retraction. The double gusset plates 36 and the converging link arms 32 and 34 reinforce the slides 28 and sleeves 26 and provide a rigid four point rectangular support for the assembly 24. This arrangement distributes the load forces over a wider area to counteract the substantial moment arm developed by the platform assembly 16, lift mechanism 18 and lift mechanism frame 14 when the assembly 24 is in the extended position.

The longer leg portion 29 of each slide 28 has a longitudinal closed slot 48 therethrough adjacent the end disposed in the sleeve 26. A safety limit stop pin 50 passes through the slot 48 and through a pair of holes through the sleeve 26. The safety pin 50 is retained in these holes by a pair of snap ring retainers on the pin 50 on either side of the sleeve 26. The safety pins 50 ensure that the extensible support assembly 24 remains connected together in the event that the linkage arms or hydraulic cylinder connections should become disconnected.

Finally, cover plates 52 are fastened to opposite sides of the fixed sleeve members 26. In FIG. 3, one of the cover plates 52 is partially broken away to reveal the components of the assembly 24 described above.

The stroke of the hydraulic cylinder 30 and the length of the slide and sleeve members 28 and 26, respectively, are determined by the amount of horizontal and vertical clearance required in a particular vehicle installation. In addition, the length of the shorter legs 31 of the slide members 28 is determined by the desired lateral spacing of the vertical support column 20 from the accessway 21. In the embodiment shown, the stroke of the hydraulic cylinder 30 is between about 6–8 inches. This allows the collapsible wheelchair lift apparatus 10 to be efficiently stored in about the same envelope of space as a lift apparatus with a short, fixed support assembly between the vertical support member 20 and the lift mechanism frame 14. The L-shaped slide members 28 permit the wheelchair lift apparatus 10 to be mounted from a vertical support column 20 which is adjacent to and spaced from the accessway 21 so that the accessway 21 remains substantially clear when the apparatus 10 is in the storage position shown in phantom in FIGS. 1 and 2.

The apparatus 10 in accordance with the present invention is operated from the storage position by depressing the foot-operated latch 54 on the vertical support column 20 which releases an index pin from its storage position socket in an index flange 56 fixed to the rotatable support tube portion 22. The lift mechanism frame 14 with collapsed lift mechanism 18 and platform assembly 16 attached may then be manually or hydraulically rotated out through the accessway 21 until the index pin engages another socket 180° displaced from the first socket in the index flange 56. The operator may then remotely operate the hydraulic cylinder 30 to extend the support assembly 24 to the deployed position shown in FIG. 1. The platform assembly 16 may then be unfolded to receive a wheelchair bound passenger thereon. The operator then remotely actuates the lift mechanism 18 to lower the platform assembly 16 to the station platform or the track level T.

Although the extensible support assembly 24 is shown extended to the lift in FIG. 3, the hydraulic cylinder 30 is preferably only extended and retracted when the support assembly 24, frame 14, platform assembly 16 and lift mechanism 18 is rotated to the operational position outside the vehicle (to the right of the support member 20 in FIG. 3) because the accessway 21 is typically too narrow to permit the extended assembly to pass therethrough. Operation of the hydraulic cylinder 30 may be manual or, alternatively, there may be an electrical interlock provided to the power supply to a hydraulic solenoid valve supplying the cylinder 30 such that the solenoid will not operate to supply hydraulic fluid to the bottom of the piston unless the index pin riding on the index flange 56 has slipped into the deployed position socket. The hydraulic cylinder 30 may also be automatically controlled by the electrical interlock such that the hydraulic cylinder rod 44 is extended automatically when the index pin slips into the deployed position socket. Similarly, the cylinder piston rod 44 could be automatically retracted when the index pin is raised out of the deployed position socket by depressing the foot lever 54. Other interlocks may also be provided to preclude assembly actuation when the apparatus 10 is in the storage position.

The extensible support assembly 24 may be constructed other than as specifically described and shown in FIGS. 1–3. For example, the fixed sleeve members 26 may be attached to the support portion 22 with the slide member 28 fixed to the frame 14. In this alternative, the sleeves would be L-shaped with the slide members telescopically received within the longer leg portions of the L-shaped sleeve.

Another alternative would be to have one slide member and one sleeve member fixed to the frame 14 and one sleeve member and one slide member fixed to the support portion 22 of the vertical support member 20. In this second alternative, the members fixed to the support portion 22 would be generally L-shaped to provide the necessary offset between the accessway and the location of the vertical support member in the deployed position.

The hydraulic cylinder 30 may also be replaced by an electrical linear actuator, an electrically driven screw drive mechanism, or any other conventional drive means for extending and retracting the telescoping slide and sleeve members.

It is therefore to be understood that while a preferred embodiment of the present invention has been set forth and disclosed herein, various modifications and changes may be made in the specific construction and arrangement of parts comprising the present invention without departing from the spirit and broad scope thereof as defined by the appended claims and reasonable equivalents. All patents, patent applications, and other printed publications referred to herein are hereby incorporated by reference in their entirety.

I claim:

1. In a vehicle having an accessway of limited width through a side wall thereof, the combination therewith of a wheelchair lift apparatus having a collapsible platform assembly for receiving and supporting a wheelchair and its occupant thereon, a vertical support column mounted inside of said vehicle adjacent to and offset from said accessway having support means rotatable about said support column for rotation of said platform assembly between a collapsed storage position within said vehicle and a deployed position within said accessway, lateral extension means disposed between said support means and said platform assembly for laterally advancing said platform assembly between the deployed position within said accessway and an extended position externally of said vehicle when said platform assembly is rotated to the deployed position, said lateral extension means comprising a pair of spaced parallel fixed sleeve members each having one end fixed to one of said platform assembly and said support means; a pair of parallel slide members each having one end telescopically received in one of said fixed sleeve members for sliding movement therein and an opposite end fixed to the other of said support means and said platform assembly; and drive means interposed between said platform assembly and said support means for controllably extending and retracting said slide members within said sleeve members to advance said platform assembly laterally between said retracted and extended positions, and a lift mechanism for raising and lowering said platform assembly in the extended position between first and second elevations, said lateral extension means being the sole means of suspension from said column of said lift mechanism above ground level when in the extended position.

2. In apparatus according to claim 1 wherein said drive means comprises a hydraulic cylinder including a piston rod drivingly connected to at least one of said sleeve members.

3. In apparatus according to claim 2 wherein said hydraulic cylinder is mounted between said pair of slide members.

4. In apparatus according to claim 3, said lateral extension means further comprising a pair of linkage arms converging from said sleeve members for pivotal connection of said piston rod thereto.

5. In apparatus according to claim 4, wherein said hydraulic cylinder is interposed between a pair of parallel gusset plates fastened to said slide members.

6. In apparatus according to claim 1 wherein each of said members fixed to said support has a longer portion and a shorter portion at an angle to said longer portion, said shorter portion being fixed to said support means.

7. In apparatus according to claim 6, wherein both of said slide members are fixed to said support means.

8. In apparatus according to claim 7, wherein said drive means comprises a hydraulic cylinder including a piston rod drivingly connected to at least one of said sleeve members.

9. The combination of a wheelchair lift apparatus and a vehicle having an accessway of a limited width through a side wall of said vehicle for ingress and egress of passengers to and from the inside of said vehicle, said apparatus comprising:

a foldable platform assembly for receiving and supporting a wheelchair and its occupant thereon, said platform assembly being foldable into a compact size capable of rotation through said accessway;

a lift mechanism for raising and lowering said platform assembly between first and second elevations outwardly of said side wall;

a vertical support column mounted inside of said vehicle and to one side of said accessway, and support means for mounting said platform assembly and said lift mechanism for rotation about said column between a storage position inside of said vehicle and a deployed position traversing the width of said accessway; and an extensible support assembly disposed between said support means and said platform assembly for laterally advancing said platform assembly from the deployed position to an extended position away from said vertical support column to provide clearance for said platform assembly beyond said side wall of said vehicle for movement between said first and second elevations, wherein said support assembly comprises at least one telescoping member operably connected between said support means and said lift mechanism for slidable advancement of said lift mechanism between said storage and said extended positions, said support assembly suspending said lift mechanism from said column above ground level when in the extended position.

10. The apparatus according to claim 9, wherein said telescoping member comprises:

a pair of parallel sleeve members each having one end fixed to one of said support means and said lift mechanism;

a pair of parallel slide members each having one end telescopically received in one of said fixed sleeve members and an opposite end fixed to the other of said support means and said lift mechanism; and drive means disposed between said platform assembly and said support means for controllably extending and retracting said slide members within said sleeve members to move said platform assembly alternately between said retracted and extended positions.

11. The apparatus according to claim 10, wherein said drive means comprises a hydraulic cylinder having an extensible piston rod connected between said support means and said lift mechanism.

12. The apparatus according to claim 11 wherein each of said sleeve members has a tubular cross section.

13. The apparatus according to claim 12, wherein said extensible support assembly further comprises a pair of linkage arms each having one end connected to said piston rod and the other end connected to one of said sleeve members.

14. The apparatus according to claim 13, wherein said tubular slide members each are generally L-shaped with a longer leg portion and a shorter leg portion, said longer leg portion being telescopically received in said sleeve member and said shorter leg portion fixed to said support means.

15. The apparatus according to claim 9, wherein said vehicle is a railway car and said telescoping member comprises:

a pair of parallel fixed sleeve members each having one end fixed to said platform assembly;

a pair of parallel generally L-shaped slide members each having an offset portion fixed to said support means; and drive means operably disposed between said lift mechanism and said support means for controllably extending and retracting said slide members within said sleeve members to move said platform assembly alternately between said retracted position and said extended position outside said vehicle.

16. The apparatus according to claim 15, wherein said drive means comprises a hydraulic cylinder fastened to said support means and having an extensible piston rod therein.

17. The apparatus according to claim 16, further comprising a pair of linkage arms each having one end connected to said piston rod and the other end connected to a separate one of said sleeve members.

18. The apparatus according to claim 17, wherein said telescopic extensible support assembly further comprises a pair of spaced apart parallel plates fastened to and sandwiching said hydraulic cylinder therebetween and fastened to each of said slide members.

19. The apparatus according to claim 18, wherein said piston rod further comprises a cross pin mounted through one end of said rod connecting said linkage arms to said piston rod.

20. The apparatus according to claim 19, wherein said plates each have a closed elongated slot extending toward said lift mechanism, each receiving and guiding one end of said cross pin therein.

21. The apparatus according to claim 20 wherein each of said plates has a generally pentagonal shape having an apex positioned toward said frame.

22. The apparatus according to claim 21, wherein said elongated slot is parallel to said piston rod and positioned along a line through said apex of said plate.

23. The apparatus according to claim 9, wherein each of said sleeve members has an elongated closed slot therein receiving a removable pin extending outward from said tubular member.

24. The apparatus according to claim 9 wherein said support means is a tube rotatably supported by said vertical support column.

25. The apparatus according to claim 24 wherein said slide members are L-shaped with each including a longer leg portion and a shorter leg portion, joined together at about a right angle, said longer leg portion being telescopically received in said sleeve member and said shorter leg portion being fixed to said support tube portion of said vertical support column.

26. The apparatus according to claim 25, wherein said drive means comprises a hydraulic cylinder mounted between a pair of gusset plates fastened to said slide members, said hydraulic cylinder having an extensible piston rod connected to said platform assembly.

27. The apparatus according to claim 26 wherein said drive means further comprises a pair of linkage arms each having one end connected to said piston rod and the other end pivotally connected to one of said sleeve members.

28. A wheelchair lift apparatus for a railway car having a doorway of limited width through a side wall of said car, said apparatus comprising:

a vertical support column mounted in said car adjacent to said side wall and offset from one side of said doorway;

a collapsible platform assembly for receiving and supporting a wheelchair and its occupant thereon;

said vertical support column having rotatable support means connected to said lift mechanism for rotation of said platform assembly about said vertical support column from a storage position along an inner surface of said side wall of said vehicle and to one side of said doorway to a deployed position in said doorway;

telescoping support assembly means disposed between said support means and said platform assembly for moving said platform assembly between a retracted position and an extended position outside of said side wall of said railway car, said telescoping support assembly means comprising a pair of parallel sleeve members each having one end fixed to one of said platform assembly or said support means, a pair of tubular slide members each having one end telescopically received in one of said sleeve members and an opposite end fixed to the other of said platform assembly or said support means and a hydraulic cylinder having an extensible piston rod therein operably disposed between said sleeve and said tubular members for laterally advancing said platform assembly to said extended position when said platform assembly is rotated through said accessway to the deployed position; and a lift mechanism operably connected to said platform assembly for raising and lowering said platform assembly between first and second elevations when said assembly is outside said railway car, said support assembly means suspending said lift mechanism from said column above ground level when in the extended position.

29. The apparatus according to claim 28, wherein said support assembly further comprises a pair of linkage arms each having one end connected to said piston rod and the other end connected to one of said sleeve members fixed to said frame.

* * * * *